(12) United States Patent
Hayashi et al.

(10) Patent No.: US 8,406,110 B2
(45) Date of Patent: Mar. 26, 2013

(54) OBJECTIVE LENS ELEMENT

(75) Inventors: Katsuhiko Hayashi, Nara (JP);
Yasuhiro Tanaka, Hyogo (JP);
Michihiro Yamagata, Osaka (JP);
Yoshiaki Komma, Osaka (JP)

(73) Assignee: Panasonic Corporation, Kadoma-shi (JP)

( * ) Notice: Subject to any disclaimer, the term of this patent is extended or adjusted under 35 U.S.C. 154(b) by 0 days.

(21) Appl. No.: 13/410,313

(22) Filed: Mar. 2, 2012

(65) Prior Publication Data

US 2012/0170439 A1 Jul. 5, 2012

Related U.S. Application Data

(63) Continuation of application No. PCT/JP2010/005696, filed on Sep. 17, 2010.

(30) Foreign Application Priority Data

Sep. 17, 2009 (JP) .................................. 2009-216227

(51) Int. Cl.
*G11B 7/135* (2006.01)

(52) U.S. Cl. .................................. 369/112.05
(58) Field of Classification Search ........................ None
See application file for complete search history.

(56) References Cited

U.S. PATENT DOCUMENTS 6,072,579 A * 6/2000 Funato ........................ 356/457
6,512,608 B2 * 1/2003 Ohyama ........................ 359/15

FOREIGN PATENT DOCUMENTS

| JP | H10-334504 A | 12/1998 |
| JP | 2004-071134 A | 3/2004 |
| JP | 2004-281034 A | 10/2004 |
| JP | 2009-009674 A | 1/2009 |
| WO | 2009-016847 A1 | 2/2009 |

OTHER PUBLICATIONS

Ryuichi Katayama et al., "Blue/DVD/CD Compatible Optical Head with Three Wavelengths and a Wavelength Selective Filter," International Symposium on Optical Memory 2001, Oct. 16-19, 2001, pp. 30-31, Taipei Taiwan.

* cited by examiner

*Primary Examiner* — Joseph Feild
*Assistant Examiner* — Parul Gupta
(74) *Attorney, Agent, or Firm* — Judge Patent Associates

(57) ABSTRACT

An objective lens element having excellent compatibility with optical discs having different base material thicknesses is provided. The objective lens element has optically functional surfaces on an incident side and an exit side. At least either one of the optically functional surfaces on the incident side and the exit side includes a diffraction portion which satisfies at least either one of the following formulas (1) and (2):

$$\theta_1 \times \theta_2 < 0 \ (\text{"×" represents multiplication}) \quad (1),$$

$$(\sin \theta_2)/\lambda_2 = -(\sin \theta_1)/\lambda_1 \quad (2),$$

where $\theta_1$ is the diffraction angle of a light beam having a diffraction order providing the maximum diffraction efficiency at the wavelength $\lambda_1$, and $\theta_2$ is the diffraction angle of a light beam having a diffraction order providing the maximum diffraction efficiency at the wavelength $\lambda_2$.

1 Claim, 11 Drawing Sheets

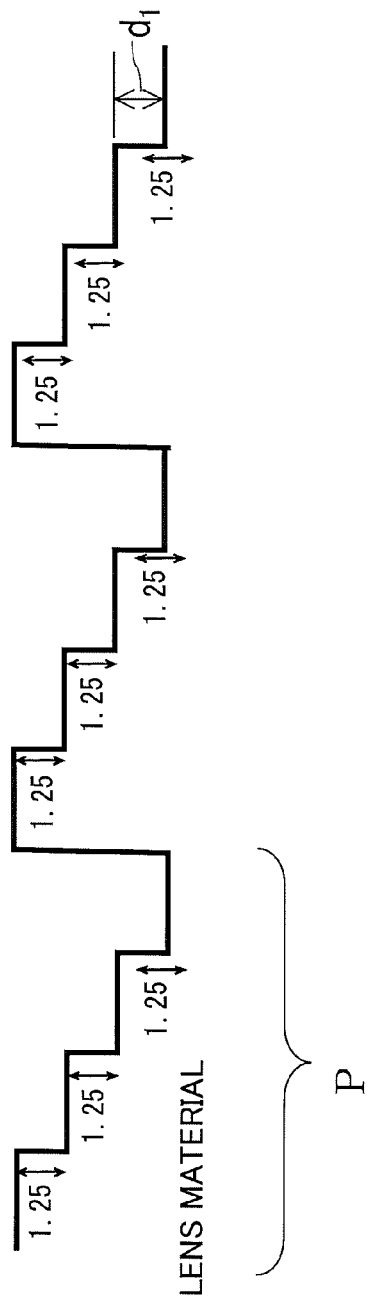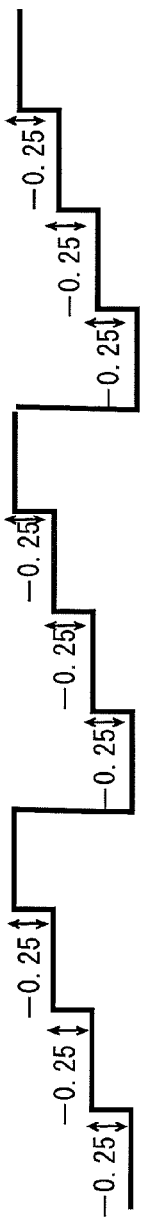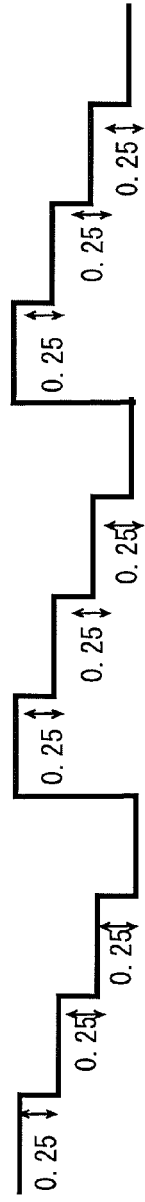
FIG. 1A
FIG. 1B
FIG. 1C

OBJECTIVE LENS ELEMENT

CROSS-REFERENCE TO RELATED APPLICATION

This application is a U.S. continuation application filed under 35 USC 111(a) claiming benefit under 35 USC 120 and 365(c) of PCT application JP2010/005696, filed Sep. 17, 2010, which claims priority to Japanese Patent Application No. 2009-216227, filed on Sep. 17, 2009. The foregoing applications are hereby incorporated herein by reference.

BACKGROUND OF THE INVENTION

1. Field of the Invention

The present invention relates to an objective lens element for use in an optical pickup device.

2. Description of the Background Art

As media that record a large amount of information with a high density, there are optical information storage media such as optical discs. Optical discs record information as pit-shaped patterns thereon, and are widely used for the purposes of recording digital audio files, video files, document files, and data files. Examples of functions required for performing recording, reproducing, and erasing of information on an optical disc with high reliability by using a light beam converged on a micro spot are a converging function to form a diffraction-limited micro spot, focus control (focus servo) of an optical system, tracking control, and pit signal (information signal) detection.

In recent years, due to advancement of optical system design technology and shortening of the wavelengths of semiconductor lasers which are light sources, development has progressed concerning optical discs that have a higher-density storage capacity further than ever. One approach to density increase is to increase the optical disc-side numerical aperture (NA) of a light-converging optical system which converges a light beam to form a micro spot on the optical disc. However, when the NA of the light-converging optical system is increased, an amount of a generated aberration increases with respect to a certain amount of tilt of the optical axis. In order to prevent this problem, it is necessary to decrease the thickness of a layer (hereinafter, referred to as "base material thickness") provided on a recording surface of the optical disc. In the present specification, the "base material thickness" means a thickness from a light beam incident surface to an information recording surface of an optical disc.

For compact discs (CD) which are first generation optical discs, infrared light (a wavelength $\lambda_3$: 780 to 820 nm) and an objective lens having an NA of 0.45 are used. The base material thickness of CD is 1.2 mm. For DVD which is second generation optical discs, red light (a wavelength $\lambda_2$: 630 to 680 nm) and an objective lens having an NA of 0.6 are used. The base material thickness of DVD is 0.6 mm. For third generation optical discs, blue light (a wavelength $\lambda_1$: 390 to 415 nm) and an objective lens having an NA of 0.85 are used. The base material thickness of third generation optical discs is 0.1 mm. As described above, as the recording density increases, the base material thickness of the optical disc decreases.

In view of economical efficiency and space occupied by an apparatus, an optical information recording/reproducing apparatus is desired which can perform recording and reproducing on optical discs having different base material thicknesses and recording densities. For this, a light-converging optical system which can converge a light beam to a diffraction limit on a recording surface of each of optical discs having different base material thicknesses, and an optical pickup device including this light-converging optical system, are necessary. In addition, when recording and reproducing are performed on an optical disc having a thick base material, it is necessary to converge a light beam on a recording surface located deeper than a beam incident surface of the optical disc, and thus the focal length has to be increased.

Prior art documents disclose configurations intended for compatible reproducing and compatible recording on an optical disc having a base material thickness of 0.6 mm and designed for the wavelength $\lambda_2$ (red light) and on an optical disc having a base material thickness of 0.1 mm and designed for the wavelength $\lambda_1$ (blue light).

A first prior art example is a configuration in which a wavelength-selective phase plate is combined with an objective lens. This is disclosed in Japanese Laid-Open Patent Publication No. 10-334504 and the Proceedings of ISOM2001 (Session We-C-05), P30.

As a second prior art example, a configuration in which a refraction type objective lens and a diffraction element are combined is disclosed. In Japanese Laid-Open Patent Publication No. 2004-071134, in an optical head device which performs recording or reproducing on a high-density optical disc by using an objective lens having a high NA, a sawtooth-like diffraction element is used in order to be able to also perform recording or reproducing on conventional optical discs such as DVD. The sawtooth height is set such that when blue light is used, the length of the optical path becomes $2\lambda$, and 2nd order diffracted light is used. The sawtooth-like diffraction element emits 1st order diffracted light when red light is incident thereon. The braze direction is as in a convex lens type, and chromatic aberration compensation of the refractive lens is performed. The diffraction order when red light is used is lower than the diffraction order when blue light is used. Thus, the sawtooth-like diffraction element serves as a concave lens for red light, thereby providing an effect that the working distance can be increased.

Further, Japanese Laid-Open Patent Publication No. 2004-071134 discloses a stair-like step structure which provides an optical path difference longer than one wavelength to blue light and which provides an optical path difference shorter than one wavelength to red light. The stair-like step structure also exerts a convex lens effect on blue light and exerts a concave lens effect on red light. Thus, when blue light is used, a chromatic aberration compensation effect of the refractive lens is exerted, and when red light is used, an effect that the working distance (the interval between the objective lens surface and the surface of an optical disc) can be increased is obtained due to the concave lens effect.

As a third conventional art example, a configuration in which a relay lens is inserted between an infrared light source and an objective lens, thereby also realizing compatibility with a first generation optical disc having a base material thickness of 1.2 mm, is disclosed in Japanese Laid-Open Patent Publication No. 2004-281034.

Japanese Laid-Open Patent Publication Nos. 10-334504 and 2004-071134 merely disclose the method for compatibility with the above second generation optical discs and the above third generation optical discs. In addition, Japanese Laid-Open Patent Publication No. 2004-281034 discloses the method for compatibility with the above first generation optical discs, but requires a relay lens.

Further, it is desired that an element that realizes compatibility is integrally formed on the objective lens surface, in view of cost reduction by decrease in number of parts. However, in the prior art described above, only the exemplary configuration, in which the phase plate or the diffraction element is provided independently of the refraction type objective lens, is disclosed, and there is no description about integrally forming an element, which realizes compatibility, on the objective lens surface.

Moreover, in order to produce objective lenses at low cost and in large quantities, the material of the objective lenses is preferably resin rather than glass. In general, the material cost of resin is low, and it is also possible to mold resin at a lower temperature than to mold glass. Thus, the mold can be used long and the molding time can be shortened. Therefore, by molding resin to produce objective lenses, the manufacturing cost can be reduced. However, the refractive index of a high-NA objective lens made of resin changes due to temperature change. The refractive index change causes the refractive power of the lens surface to shift from a designed value, whereby a spherical aberration occurs. A lower-order aberration greatly deteriorates the quality of an information reproduction signal, and thus a 3rd order spherical aberration is problematic.

SUMMARY OF THE INVENTION

It is an object of the present invention to provide an objective lens element having excellent compatibility with optical discs having different base material thicknesses.

The present invention is directed to an objective lens element which has optically functional surfaces on an incident side and an exit side, which converges a first incident light beam of a wavelength $\lambda_1$ through a base plate having a thickness $t_1$ to form a spot, and which converges a second incident light beam of a wavelength $\lambda_2$ longer than the wavelength $\lambda_1$ through a base plate having a thickness $t_2$ larger than the thickness $t_1$ to form a spot.

In the objective lens element of the present invention, at least either one of the optically functional surfaces on the incident side and the exit side includes a diffraction portion which satisfies at least either one of the following formulas (1) and (2):

$$\theta_1 \times \theta_2 < 0 \text{ ("×" represents multiplication)} \quad (1), \text{ and}$$

$$(\sin \theta_2)/\lambda_2 = -(\sin \theta_1)/\lambda_1 \quad (2),$$

where $\theta_1$ is the diffraction angle of a light beam having a diffraction order providing the maximum diffraction efficiency at the wavelength $\lambda_1$ ($\theta_2 \neq 0$), and $\theta_2$ ($\neq 0$) is the diffraction angle of a light beam having a diffraction order providing the maximum diffraction efficiency at the wavelength $\lambda_2$ ($\theta_2 \neq 0$).

Alternatively, in the objective lens element of the present invention, at least either one of the optically functional surfaces on the incident side and the exit side includes a diffraction portion which satisfies the following formula (3):

$$\Phi_2 < \Phi_{02} < \Phi_{01} < \Phi_1 \quad (3),$$

where $\Phi_1$ is the power of a surface acting on a light beam having a diffraction order providing the maximum diffraction efficiency at the wavelength $\lambda_1$ ($\Phi_1 \neq 0$), $\Phi_2$ is the power of the surface acting on a light beam having a diffraction order providing the maximum diffraction efficiency at the wavelength $\lambda_2$ ($\Phi_2 \neq 0$), $\Phi_{01}$ is the power of a base refractive surface obtained by removing power by diffraction from $\Phi_1$, and $\Phi_{02}$ is the power of the base refractive surface obtained by removing power by diffraction from $\Phi_2$.

According to the present invention, an objective lens element having excellent compatibility with optical discs having different base material thicknesses can be realized.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1A is a diagram illustrating a diffraction structure formed on a surface of an objective lens element according to Embodiment 1;

FIG. 1B is a diagram illustrating a diffraction structure formed on a surface of an objective lens element according to Embodiment 1;

FIG. 1C is a diagram illustrating a diffraction structure formed on a surface of an objective lens element according to Embodiment 1;

DESCRIPTION OF THE PREFERRED EMBODIMENTS

Embodiment 1

Compatibility with BD and DVD

Figure 2:
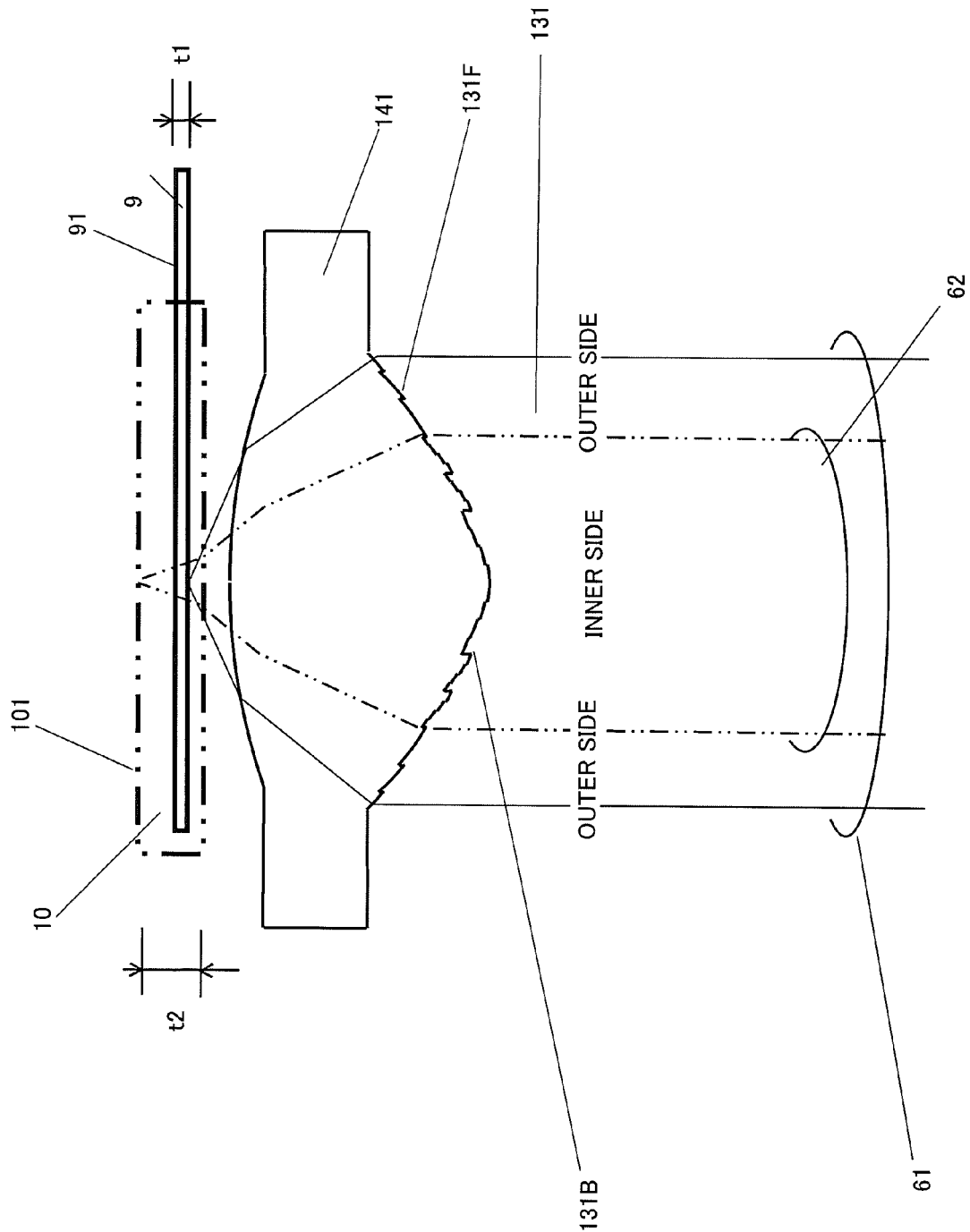
FIG. 2 is a diagram showing the objective lens element according to Embodiment 1.

FIG. 1A to 1C is a diagram illustrating a diffraction structure formed on a surface of an objective lens element according to Embodiment 1. Specifically, FIG. 1A is a diagram illustrating the physical shape of the diffraction structure, and FIG. 1B shows an amount of phase change provided by the diffraction structure shown in FIG. 1A to light of a wavelength $\lambda_2$ (red light). FIG. 1C shows an amount of phase change provided by the cross-sectional shape shown in FIG. 1A to light of a wavelength $\lambda_1$ (blue light). The steps of FIG. 1A are formed on a base surface which is a refractive surface (aspherical shape) in the surface of the objective lens element.

In FIG. 1A, the vertical direction indicates the thickness (height) of the lens material in the optical axis direction. Hereinafter, the shape shown in FIG. 1A is referred to as "binary diffraction structure". For example, when a polyolefin resin is used as the material of the objective lens element, a material having a refractive index $n_b$ of about 1.522 with respect to the blue light of the wavelength $\lambda_1$ can be used. A step $d_1$ (hereinafter, also referred to as "unit step") provides an optical path difference of about 1.25 wavelength, or a phase difference of about $(2\pi+\pi/2)$, to the light of the wavelength $\lambda_1$. As an example, where $\lambda_1$ is 405 nm and $n_b$ is 1.522, the height of the unit step $d_1$ is $\lambda_1/(n_b-1) \times 1.25 = 0.97$ μm.

It should be noted that the "optical path difference" means the difference between the length of an optical path in the case where the steps are present (the medium of the step portion is the lens material) and the length of an optical path in the case where no steps are present (the medium of the step portion is air).

FIG. 1A shows that the optical path difference caused by the unit step $d_1$ is 1.25 times that of the blue wavelength $\lambda_1$. The optical path difference caused by the unit step $d_1$ is obtained by step height/$(n_b-1)$, and thus 1.25 is a value obtained by dividing step height/$(n_b-1)$ by $\lambda_1$.

Where the unit step is $d_1$, the height (level) from the base surface is an integral multiple of $d_1$. Thus, an amount of phase change provided by the step shape to the light of the wavelength $\lambda_1$ is an integral multiple of $(2\pi+\pi 2)$. This substantially means that the amount of phase change changes by $\pi/2$ per step each time the height from the base surface increases by one unit step as shown in FIG. 1C.

A lens material that is a polyolefin resin has a refractive index $n_r$ of about 1.505 with respect to the light of the wavelength $\lambda_2$. The optical path difference provided by the step $d_1$ to the light of the wavelength $\lambda_2$ can be represented by $d_1 \times (n_r-1)$. Where $\lambda_1$ is 405 nm, $\lambda_2$ is 650 nm, $n_b$ is 1.522, and $n_r$ is 1.505, the optical path difference corresponds to about 0.75 wavelength, and this means that the amount of phase change changes by $-\pi/2$ each time the height from the base surface increases by one step $(d_1)$.

When the height of each step structure from the base surface is an integral multiple of $d_1$ and a stair-like cross-sectional shape is provided as shown in FIG. 1A, the amount of phase change provided to the light of the wavelength $\lambda_1$ changes by $\pi/2$ per step as shown in FIG. 1C. In other words, the optical path difference changes in steps of $+\frac{1}{4}$ wavelength.

Meanwhile, as shown in FIG. 1B, the amount of phase change provided to the light of the wavelength $\lambda_2$ changes by $-\pi/2$ per step. In other words, the optical path difference changes in steps of $-\frac{1}{4}$ wavelength. The amount of phase change is positive when the light of the wavelength $\lambda_1$ is used, while the amount of phase change is negative when the light of the wavelength $\lambda_2$ is used. This means that the light of the wavelength $\lambda_1$ and the light of the wavelength $\lambda_2$ are subjected to the opposite actions from the steps.

For example, when the intervals at which the phase steps are formed are appropriately set such that a convex lens effect is exerted on the light of the wavelength $\lambda_1$, a concave lens effect is exerted on the light of the wavelength $\lambda_2$. Then, the focal point of the light of the wavelength $\lambda_1$ gets close to the objective lens element, while the focal point of the light of the wavelength $\lambda_2$ moves away from the objective lens element. Thus, an effect is obtained that the light of the wavelength $\lambda_2$ can be converged on an information recording surface through a thicker base material.

FIG. 2 is a diagram illustrating the objective lens element according to Embodiment 1.

On an optically functional surface of the objective lens element 141 on an incident side, an inner part 131B including a rotational symmetry axis and a ring-shaped outer part 131F surrounding the inner part 131B are provided. When the light of the wavelength $\lambda_1$ is used, the objective lens element 141 converges first incident light 61 incident on both the inner part 131B and the outer part 131F, and forms a spot on an information recording surface 91 of an optical disc 9 through a base material having a thickness $t_1$. In addition, when the light of the wavelength $\lambda_2$ is used, the objective lens element 141 converges second incident light 62 incident on the inner part 131B, and forms a spot on an information recording surface 101 of an optical disc 10 through a base material having a thickness $t_2$. The outer part 131F is a region which substantially does not contribute to spot formation when the light of the wavelength $\lambda_2$ is used. Where the numerical aperture defined when the first incident light 61 is converged on the information recording surface 91 of the optical disc 9 is $NA_1$ and the numerical aperture defined when the second incident light 62 is converged on the information recording surface 101 of the optical disc 10 is $NA_2$, $NA_1$ is equal to or higher than 0.85 and $NA_2$ is equal to or higher than 0.6.

In other words, the inner part 131B is a region shared by the light of the wavelength $\lambda_1$ and the light of the wavelength $\lambda_2$, and the outer part 131F is a region dedicated for the light of the wavelength $\lambda_1$. On the inner part 131B, the stair-like step structure shown in FIG. 1A is formed.

Figures 3, 4A, 4B, 4C:
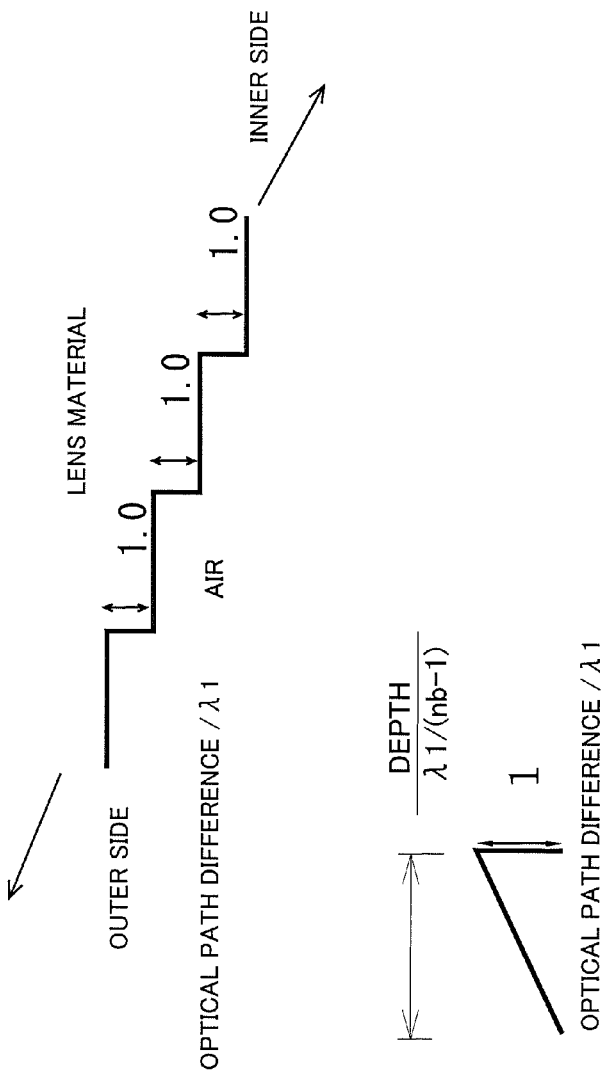
FIG. 3 is a diagram showing an example of a step structure provided on an outer part.
FIG. 4A is a diagram showing an example of a sawtooth-like diffraction structure provided on the outer part.
FIG. 4B is a diagram showing an example of a sawtooth-like diffraction structure provided on the outer part.
FIG. 4C is a diagram showing an example of a sawtooth-like diffraction structure provided on the outer part.

FIG. 3 is a diagram showing an example of a step structure provided on the outer part, and FIG. 4 is a diagram showing an example of a sawtooth-like diffraction structure provided on the outer part.

A sawtooth-like diffraction structure may be formed on the outer part 131F, and designing may be performed such that the light of the wavelength $\lambda_1$ incident on the outer part 131F is converged on the information recording surface 101 through the base material having the thickness $t_1$, and the light of the wavelength $\lambda_2$ incident on the outer part 131F causes a great aberration and is substantially not converged on the information recording surface 91.

Alternatively, a stair-like binary diffraction structure which is the same as that on the inner part 131B may be provided on the outer part 131F.

Still alternatively, no steps may be formed on the outer part 131F, and designing may be performed such that the light of the wavelength $\lambda_1$ incident on the outer part 131F is converged on the information recording surface 101 through the base material having the thickness $t_1$, and the light of the wavelength $\lambda_2$ incident on the outer part 131F causes a great aberration and is substantially not converged on the information recording surface 91.

Still alternatively, steps each of which causes an optical path difference of 1 wavelength of the wavelength $\lambda_1$ may be formed on the outer part 131F as shown in FIG. 3. Each of the steps substantially does not provide a phase difference to the light of the wavelength $\lambda_1$, and thus the light of the wavelength $\lambda_1$ incident on the outer part 131F is converged on the information recording surface 101 through the base material having the thickness $t_1$. Meanwhile, each of the steps provides a phase difference of about 0.6 wavelength to the light of the wavelength $\lambda_2$, and thus the light of the wavelength $\lambda_2$ incident on the outer part 131F causes a great aberration and is substantially not converged on the information recording surface 91.

Still alternatively, a sawtooth-like diffraction grating may be formed on the outer part 131F, and designing may be performed such that the light of the wavelength $\lambda_1$ incident on the outer part 131F is converged on the information recording surface 101 through the base material having the thickness $t_1$ and the light of the wavelength $\lambda_2$ incident on the outer part 131F is not converged on the information recording surface 91. In this case, the sawtooth height suffices to be set to such a height that an optical path difference of 1 wavelength is caused to the light of the wavelength $\lambda_1$ as shown in FIG. 4A. Since the optical path difference provided by the sawtooth to the light of the wavelength $\lambda_1$ is 1 time that of the wavelength $\lambda_1$ as shown in FIG. 4B, the diffraction efficiency of the 1st order diffracted light increases, and the light of the wavelength $\lambda_1$ incident on the outer part 131F is converged on the information recording surface 101 through the base material having the thickness $t_1$. Meanwhile, the optical path difference provided by the sawtooth to the light of the wavelength $\lambda_2$ is only about 0.6 times that of wavelength, and thus the light of the wavelength $\lambda_2$ is diffracted into 1st order diffracted light and zero order diffracted light and is not converged on a point. In this manner, the sawtooth-like diffraction grating provided on the outer part 131F exerts an aperture limiting function. The diffraction order providing the maximum diffraction efficiency of the light of the wavelength $\lambda_1$ is not particularly limited to a specific order.

The material of the objective lens element is not particularly limited to a specific one. When resin is used, it is possible to perform designing such that aberration deterioration caused by temperature change is suppressed.

Here, conditions which are to be satisfied by the objective lens element according to the present embodiment will be described.

The objective lens element according to the present embodiment satisfies at least either one of the following condition (1) or (2).

$$\theta_1 \times \theta_2 < 0 \text{ (``×'' represents multiplication)} \quad (1)$$

$$(\sin \theta_2)/\lambda_2 = -(\sin \theta_1)/\lambda_1 \quad (2)$$

Here, $\theta_1$ is the diffraction angle of a light beam having a diffraction order providing the maximum diffraction efficiency at the wavelength $\lambda_1$, and $\theta_2$ is the diffraction angle of a light beam having a diffraction order providing the maximum diffraction efficiency at the wavelength $\lambda_2$.

The condition (1) defines that the diffraction direction of the light of the wavelength $\lambda_1$ is opposite to the diffraction direction of the light of the wavelength $\lambda_2$. As described above, the phase modulation shown in FIG. 1C is performed on the light of the wavelength $\lambda_1$. When one unit structure is taken as being composed of consecutive four steps in FIG. 1A, the step structure of FIG. 1A can be approximately considered as a periodic sawtooth-like diffraction structure. A light beam incident on a diffractive surface from the upward direction of the sheet is diffracted leftward at a predetermined diffraction angle $\theta_1$. When the light of the wavelength $\lambda_2$ is incident on the same periodic structure, the phase modulation shown in FIG. 1B is performed. Thus, similarly to the case of the wavelength $\lambda_1$, when the step structure of FIG. 1A is taken as a periodic sawtooth-like diffraction structure, a light beam incident on the diffractive surface from the upward direction of the sheet is diffracted rightward at a predetermined diffraction angle $\theta_2$.

The condition (2) defines the relationship between wavelength and diffraction angle. Where the diffraction angle of the light of the wavelength $\lambda_1$ is $\theta_1$, the wavelength is $\lambda_1$, the diffraction order is $m_1$ order, and the pitch of the unit structure is P, it is satisfied that $\sin \theta_1 = (\lambda_1/P) \times m_1$. In addition, where the diffraction angle of the light of the wavelength $\lambda_2$ is $\theta_2$, the wavelength is $\lambda_2$, the diffraction order is $m_2$ order, and the pitch of the unit structure is P, it is satisfied that $\sin \theta_2 = (\lambda_2/P) \times m_2$. In the present embodiment, the depth of each step is adjusted such that the diffraction order providing the maximum diffraction efficiency of the light of the wavelength $\lambda_1$ is +1st ($m_1$=1) and the diffraction order providing the maximum diffraction efficiency of the light of the wavelength $\lambda_2$ is −1st ($m_2$=−1). Here, minus of a diffraction order indicates that the direction of the diffraction order is opposite to that of the diffraction order +1 of the light of the wavelength $\lambda_1$. The condition (2) is derived from these two equations.

The objective lens element according to the present embodiment satisfies the following condition (3).

$$\Phi_2 < \Phi_{02} < \Phi_{01} < \Phi_1 \quad (3)$$

Here, $\Phi_1$ is the power of a surface acting on a light beam having a diffraction order providing the maximum diffraction efficiency at the wavelength $\lambda_1$ ($\Phi_1 \neq 0$), $\Phi_2$ is the power of the surface acting on a light beam having a diffraction order providing the maximum diffraction efficiency at the wavelength $\lambda_2$ ($\Phi_2 \neq 0$), $\Phi_{01}$ is the power of a base refractive surface obtained by removing power by diffraction from $\Phi_1$, and $\Phi_{02}$ is the power of the base refractive surface obtained by removing power by diffraction from $\Phi_2$.

The condition (3) defines the relationship between power by diffraction (including both diffraction and refraction) of the objective lens element and power by refraction. The power of a lens surface is the inverse of the focal length of the surface. Thus, the condition (3) is equal to the following condition (3)'. The reason why these conditions (3) and (3)' are satisfied is that designing is performed such that the binary diffraction structure exerts a convex lens effect on the light of the wavelength $\lambda_1$ and exerts a concave lens effect on the light of the wavelength $\lambda_2$ as described above.

$$f_1 < f_{01} < f_{02} < f_2 \quad (3)'$$

Here, $f_1$ is the focal length for light having a diffraction order providing the maximum diffraction efficiency at the wavelength $\lambda_1$, $f_2$ is the focal length for light having a diffraction order providing the maximum diffraction efficiency at the wavelength $\lambda_2$, $f_{01}$ is the focal length of the base refractive surface obtained by removing an influence of diffraction from $f_1$, and $f_{02}$ is the focal length of the base refractive surface obtained by removing an influence of diffraction from $f_2$.

In the case of a conventional sawtooth-like diffraction shape, even when light having different wavelengths is incident thereon, the signs of diffraction angles are not opposite to each other. In other words, when light having different wavelengths is incident on a sawtooth-like relief shape, light of a relatively long wavelength is diffracted at a high diffraction angle but light of a relatively short wavelength is diffracted at a diffraction angle lower than this angle. The diffraction angles are different but the directions (signs) of the diffraction are the same.

In contrast, the diffraction structure according to the present embodiment can reverse the signs of the diffraction angles for light having different wavelengths. For example, the diffraction structure is useful for increasing the focal length to ensure a sufficient working distance of the objective lens element for DVD.

In general, the level of difficulty in manufacturing an objective lens element for BD increases as the working distance (WD) increases. In addition, in a BD/DVD compatible objective lens element, the base material is thicker in DVD than in BD, and thus the focal length is increased in order to ensure a sufficient working distance in using DVD. In this case, since the working distance in using BD is increased, the level of difficulty in manufacturing a lens increases. In the conventional art, a compatible method in which a diffraction structure is provided to create a difference in focal length on the basis of a used wavelength difference has been used. However, in this method, since a difference in diffraction angle for each used wavelength is utilized, the pitch of diffraction zones has to be very small in order to obtain a sufficient working distance for DVD, leading to decrease in diffraction efficiency. On the other hand, due to diffraction power being increased, a chromatic aberration in using BD increases.

In contrast, when the diffraction structure according to the present invention is used, a sufficient working distance for DVD can be ensured with diffraction zones having a relatively large diffraction pitch. The diffraction structure according to the present invention can provide negative diffraction power to the light of the wavelength $\lambda_2$ for DVD, can provide positive diffraction power to the light of the wavelength $\lambda_1$ for BD, and can compensate a chromatic aberration at the same time.

Embodiment 2

Compatibility with BD, DVD, and CD

Figure 5:
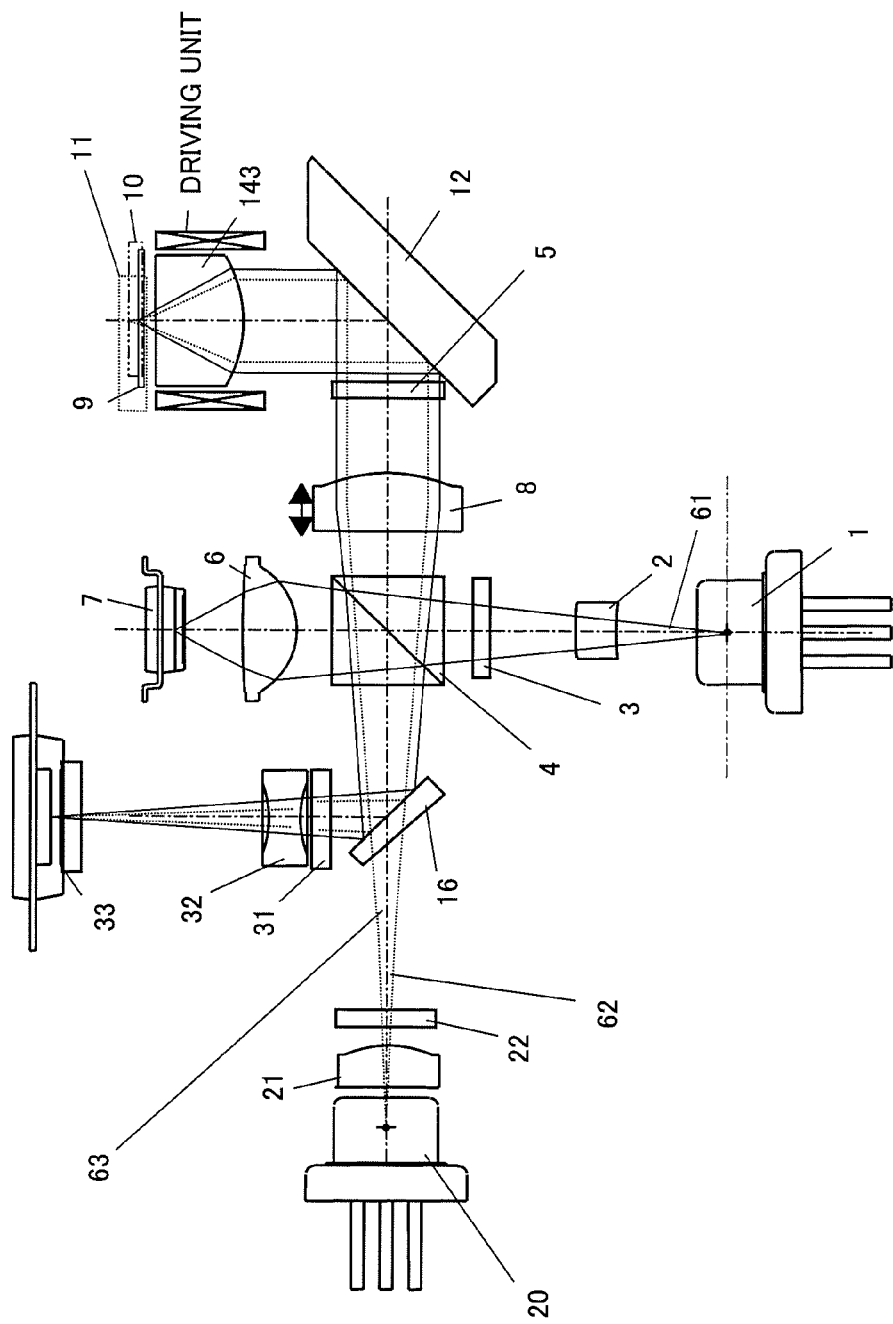
FIG. 5 is a configuration diagram of an optical pickup device according to Embodiment 2.

FIG. 5 is a configuration diagram of an optical pickup device according to Embodiment 2. The optical pickup device of FIG. 5 includes a laser beam source 1 which emits blue light of the wavelength $\lambda_1$ (390 nm to 415 nm: normally about 408 nm), a laser beam source 20 which selectively emits red light of the wavelength $\lambda_2$ (630 nm to 680 nm: normally 660 nm is often used) and infrared light of a wavelength $\lambda_3$ (770 nm to 810 nm: normally 780 nm), a collimating lens 8, an upward reflection mirror 12 which bends an optical axis, and an objective lens element 143.

The optical disc 9 is a third generation optical disc which has a base material thickness $t_1$ of about 0.1 mm and on which recording or reproducing is performed with a light beam of the wavelength $\lambda_1$. The optical disc 10 is a second generation optical disc, such as DVD, which has a base material thickness $t_2$ of about 0.6 mm and on which recording or reproducing is performed with a light beam of the wavelength $\lambda_2$. An optical disc 11 is a first generation optical disc, such as CD, which has a base material thickness $t_3$ of about 1.2 mm and on which recording or reproducing is performed with a light beam of the wavelength $\lambda_3$. In FIG. 5, portions of the optical discs 9 and 10, namely, only the base materials from light incident surfaces to recording surfaces, are shown. In reality, each of the optical discs 9 and 10 is attached to a protective plate in order to reinforce mechanical strength and to have an overall thickness of 1.2 mm which is the same as the thickness of CD. The optical disc 10 is attached to a protective plate having a thickness of 0.6 mm, and the optical disc 9 is attached to a protective plate having a thickness of 1.1 mm. A thin protective plate is provided on the optical disc 11 as well. In FIG. 5, illustration of the protective plates is omitted for simplification.

In FIG. 5, the configuration employing the two-wavelength laser beam source 20 which emits the light of the wavelengths $\lambda_2$ and $\lambda_3$ is shown. However, a configuration in which different light sources are prepared for these wavelengths, respectively, and optical paths are combined by using a dichroic mirror, is also possible.

The laser beam sources 1 and 20 are preferably semiconductor laser sources. By using semiconductor laser sources, the optical pickup device and an optical information apparatus employing this optical pickup device can be decreased in size, weight, and power consumption.

When recording or reproducing is performed on the highest-recording density optical disc 9, a blue light beam 61 of the wavelength $\lambda_1$ emitted from the laser beam source 1 is reflected by a beam splitter 4, is converted by the collimating lens 8 into substantially parallel light, and is further converted by a quarter wavelength plate 5 into circular polarized light. The quarter wavelength plate 5 is designed to serve as a quarter wavelength plate for the light of both wavelengths $\lambda_1$ and $\lambda_2$. The light emitted from the quarter wavelength plate 5 is further bent by the upward reflection mirror 12, and is converged by the objective lens element 143 on the information recording surface through the base material of the optical disc 9 which has a thickness of about 0.1 mm. Here, for convenience of the drawing, the upward reflection mirror 12 is shown to bend the light beam in the upward direction of the drawing. However, in reality, the upward reflection mirror 12 is disposed so as to bend the light beam in a direction orthogonal to the sheet.

The blue light beam 61 reflected by the information recording surface travels along the optical path in the reverse direction and is converted by the quarter wavelength plate 5 into linearly polarized light having a polarization plane orthogonal to the polarization plane of the initial linearly polarized light. The light emitted from the quarter wavelength plate 5 almost totally passes through the beam splitter 4, is totally reflected by a beam splitter 16, is diffracted by a detection diffraction element 31 is further converged by a detection lens 32, and is incident on a photodetector 33. Output of the photodetector 33 is subjected to arithmetic processing to obtain a servo signal and an information signal which are used for focus control and tracking control. The beam splitter 4 includes a polarization splitting film which, with regard to a light beam of the wavelength $\lambda_1$, totally reflects linearly polarized light having a certain direction and totally passes linearly polarized light having a direction orthogonal to the certain direction, as described above. In addition, as described later, the polarization splitting film totally passes a red light beam 62 and infrared light which are emitted from the laser beam source 20. As described above, the beam splitter 4 is an optical path branching element which has polarization properties as well as wavelength selectivity. It is also possible to eliminate the polarization dependency of the beam splitter 4 and to omit the quarter wavelength plate 5.

Next, when recording or reproducing is performed on the optical disc 10, a light beam of the wavelength $\lambda_2$ which is substantially linearly polarized light emitted from the laser beam source 20 passes through the beam splitter 16 and the beam splitter 4 and is converted by the collimating lens 8 into substantially parallel light. The light beam emitted from the collimating lens 8 is bent by the upward reflection mirror 12 and is converged by the objective lens element 143 on the information recording surface through the base material of the optical disc 10 which has a thickness of about 0.6 mm.

The light beam reflected by the information recording surface travels along the optical path in the reverse direction, almost totally passes through the beam splitter 4, is totally reflected by the beam splitter 16, is diffracted by the detection diffraction element 31, is converged by the detection lens 32, and is incident on the photodetector 33. Output of the photodetector 33 is subjected to arithmetic processing to obtain a servo signal and an information signal which are used for focus control and tracking control. In order to obtain servo signals for the optical disc 9 and 10 from the common photodetector 33 as described above, the light-emitting point of the laser beam source 1 and the red light-emitting point of the laser beam source 20 are located in a construct-image relation with respect to a common position on the objective lens 143. When such a configuration is provided, the number of detectors and the number of wires can be reduced.

The beam splitter 16 includes a polarization splitting film which, with regard to light of the wavelength $\lambda_2$, totally passes linearly polarized light having a certain direction and totally reflects linearly polarized light having a direction orthogonal to the certain direction. The beam splitter 16 totally passes the blue light beam 61 of the wavelength $\lambda_1$. As described above, the beam splitter 16 is also an optical path branching element which has polarization properties as well as wavelength selectivity. It is also possible to eliminate the polarization dependency of the beam splitter 16 and to omit the quarter wavelength plate 5. The optical path when the laser beam source 20 is caused to emit infrared light to perform recording or reproducing on the optical disc 11 is the same as that when the light source 20 is caused to emit red light of the wavelength $\lambda_2$ to perform recording or reproducing on the optical disc 10.

As shown in FIG. 5, a three-beam grating (diffraction element) 3 may be disposed between the laser beam source 1 and the beam splitter 4. In this case, it is possible to detect a tracking error signal of the optical disc 9 by the well-known differential push-pull (DPP) method. In addition, a relay lens 2 can be disposed between the laser beam source 1 and the beam splitter 4 to set the numerical aperture on the collimating lens 8 side of the light beam 61 to an appropriate value.

Moreover, a three-beam grating (diffraction element) 22 may be disposed between the laser beam source 20 and the beam splitter 16. In this case, it is possible to detect a tracking error signal of the optical disc 10 by the well-known differential push-pull (DPP) method. In addition, it is effective to change the parallelism of a light beam by moving the collimating lens 8 along the optical axis direction (the right-left direction in FIG. 5). A spherical aberration occurs due to a thickness error of the base material. When the optical disc 9 has multilayer information recording surfaces, a spherical aberration occurs due to a difference of the base material thickness for each information recording surface. These spherical aberrations can be compensated by moving the collimating lens 8 along the optical axis direction.

Spherical aberration compensation performed by moving the collimating lens 8 is possible with about several hundreds m$\lambda$ when the NA is 0.85, and a spherical aberration corresponding to the fluctuation range of base material thickness of ±30 μm can also be compensated. In addition, when recording or reproducing is performed on the optical disc 11 by using the infrared light beam, the collimating lens 8 can be moved toward the left side of FIG. 5, namely, toward the laser beam source 20 to convert a light beam travelling toward the objective lens element 143, into diverging light. Thus, a convergence spot formed on an information recording surface of the optical disc 11 can be moved further away from the objective lens element 143, a part of an aberration caused by the base material thickness can be compensated, an aberration compensation amount required for the optical element 131 can be reduced to reduce the number of steps, and hence production of an optical element can be made easy.

Moreover, the beam splitter 4 may pass a portion (e.g., about 10%) of the linearly polarized light of the wavelength $\lambda_1$ emitted from the laser beam source 1. The passed light beam is guided by a converging lens 6 to a photodetector 7. A signal obtained from the photodetector 7 is used to monitor change in amount of the light emitted by the laser beam source 1, and the change in amount of the light is fed back, whereby control can be performed such that the amount of the light emitted by the laser beam source 1 is kept constant.

Moreover, the beam splitter 4 may reflect a portion (e.g., about 10%) of the linearly polarized light emitted from the laser beam source 20. The reflected light beam is guided by the converging lens 6 to the photodetector 7. A signal obtained from the photodetector 7 is used to monitor change in amount of the light emitted by the laser beam source 20, and the change in amount of the light is fed back, whereby control can be performed such that the amount of the light emitted by the laser beam source 20 is kept constant.

Figure 6:
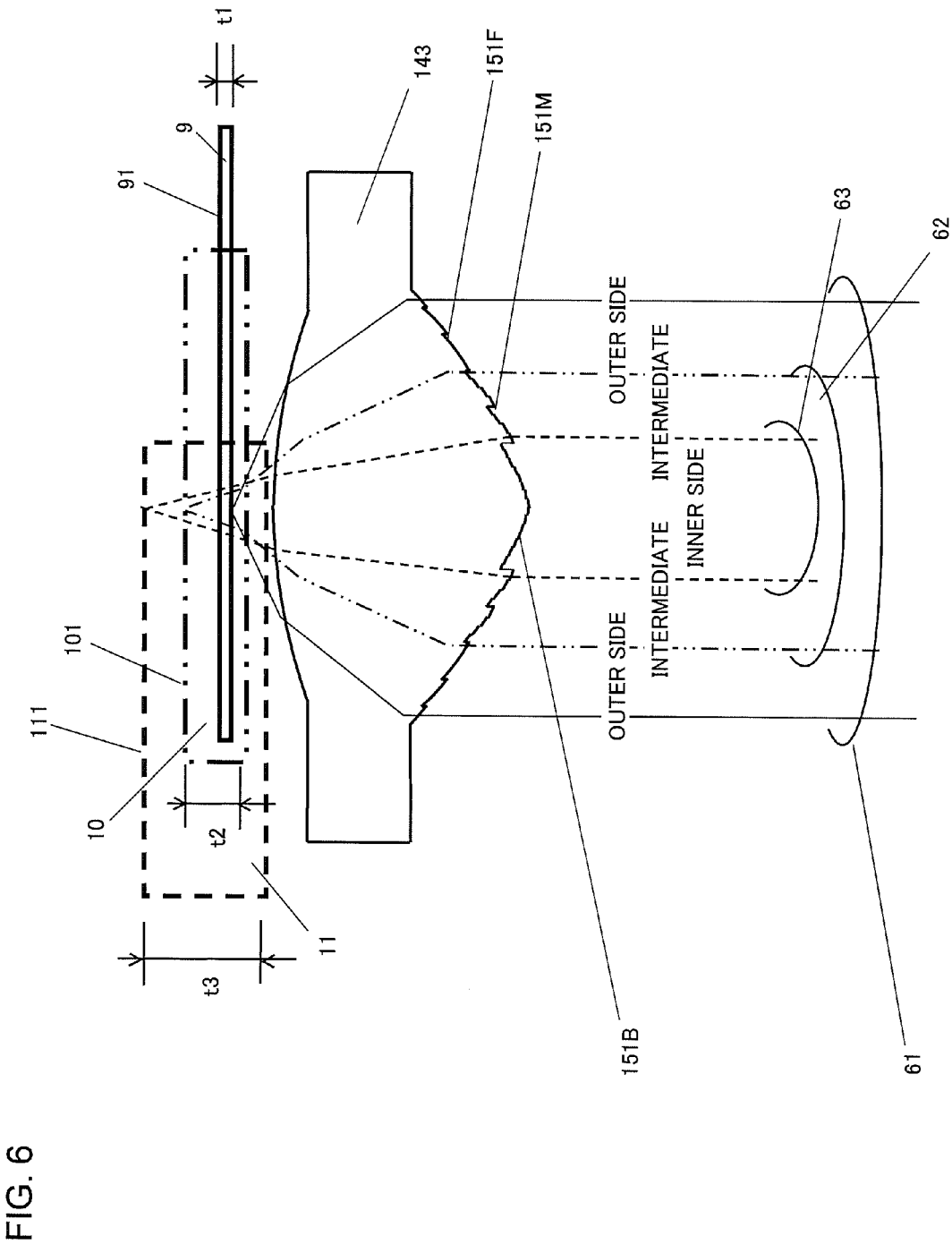
FIG. 6 is a diagram showing in detail an objective lens used in the optical pickup device according to Embodiment 2.

FIG. 6 is a diagram showing in details an object lens element used in the optical pickup device according to Embodiment 2. The objective lens element 143 has a first surface on an incident side and a second surface on an exit side. The first surface is divided into three concentric regions, and different diffraction structures are formed on these regions, respectively. The second surface is divided into two concentric regions, and different aspheric surfaces are formed on these regions, respectively.

Specifically, the first surface is divided into an inner region 151B including the optical axis, an intermediate region 151M surrounding the inner region 151B, and an outer region 151F surrounding the intermediate region 151M. A stair-like binary diffraction structure consisting of eight steps is formed on the inner region 151B. The depth of each step is set so as to correspond to an optical path length of 1.25 wavelengths of the wavelength $\lambda_1$ of the blue light. In this case, the diffraction order of a light beam having the highest diffraction efficiency is +2nd order for the blue light of the wavelength $\lambda_1$, −2nd order for the red light of the wavelength $\lambda_2$, and −3rd order for the infrared light of the wavelength $\lambda_3$.

A stair-like binary diffraction structure consisting of four steps is formed on the intermediate region 151M. The depth of each step is set so as to correspond to an optical path length of 1.25 wavelengths of the wavelength $\lambda_1$ of the blue light. In this case, the diffraction order of a light beam having the highest diffraction efficiency is +1st order for the blue light of the wavelength $\lambda_1$ and −1st order for the red light of the wavelength $\lambda_2$.

A conventional sawtooth-shaped diffraction structure is formed on the outer region 151F. The depth of each sawtooth is set so as to correspond to an optical path length of 3 wavelengths of the wavelength $\lambda_1$ of the blue light. The depth is not limited to 3 wavelengths and suffices to be an integral multiple of the wavelength $\lambda_1$. Alternatively, the outer region 151F may not be the sawtooth-shaped diffraction structure and may be an aspheric surface or a binary diffractive surface.

The objective lens element 143 according to the present embodiment is advantageous in that a sufficient working distance is easily ensured, since the sign of the diffraction angle of the blue light of the wavelength $\lambda_1$ is opposite to the signs of the diffraction angles of the red light of the wavelength $\lambda_2$ and the infrared light of the wavelength $\lambda_3$.

Here, the objective lens element 143 according to the present embodiment satisfies the following condition (4).

$$\Phi_3 < \Phi_2 < \Phi_{03} < \Phi_{02} < \Phi_{01} < \Phi_1 \tag{4}$$

Here, $\Phi_1$ is the power of a surface acting on a light beam having a diffraction order providing the maximum diffraction efficiency at the wavelength $\lambda_1$ ($\Phi_1 \neq 0$), $\Phi_2$ is the power of the surface acting on a light beam having a diffraction order providing the maximum diffraction efficiency at the wavelength $\lambda_2$ ($\Phi_2 \neq 0$), $\Phi_3$ is the power of the surface acting on a light beam having a diffraction order providing the maximum diffraction efficiency at the wavelength $\lambda_3$ ($\Phi_3 \neq 0$), $\Phi_{01}$ is the power of a base refractive surface obtained by removing power by diffraction from $\Phi_1$, $\Phi_{02}$ is the power of the base refractive surface obtained by removing power by diffraction from $\Phi_2$, and $\Phi_{03}$ is the power of the base refractive surface obtained by removing power by diffraction from $\Phi_3$.

The condition (4) defines the relationship between power by diffraction (including both diffraction and refraction) of the objective lens element and power by refraction. The power of a lens surface is the inverse of the focal length of the surface. Thus, the condition (4) is equal to the following condition (4)'. The reason why these conditions (4) and (4)' are satisfied is that designing is performed such that the binary diffraction structure exerts a convex lens effect on the light of the wavelength $\lambda_1$ and exerts a concave lens effect on the light of the wavelengths $\lambda_2$ and $\lambda_3$.

$$f_1 < f_{01} < f_{02} < f_{03} < f_2 < f_3 \qquad (4)'$$

Here, $f_1$ is the focal length for light having a diffraction order providing the maximum diffraction efficiency at the wavelength $\lambda_1$, $f_2$ is the focal length for light having a diffraction order providing the maximum diffraction efficiency at the wavelength $\lambda_2$, $f_3$ is the focal length for light having a diffraction order providing the maximum diffraction efficiency at the wavelength $\lambda_3$, $f_{01}$ is the focal length of the base refractive surface obtained by removing an influence of diffraction from $f_1$, $f_{02}$ is the focal length of the base refractive surface obtained by removing an influence of diffraction from $f_2$, and $f_{03}$ is the focal length of the base refractive surface obtained by removing an influence of diffraction from $f_3$.

EXAMPLES

Hereinafter, numerical Examples of the present invention will be specifically described with construction data, aberration diagrams, and the like. In each Numerical Example, a surface to which an aspheric coefficient is provided indicates a refractive optical surface having an aspherical shape or a surface (e.g., a diffractive surface) having a refraction function equal to that of an aspheric surface. The surface shape of an aspheric surface is defined by the following formula 1.

$$X = \frac{C_j h^2}{1 + \sqrt{1 - (1+k_j)C_j^2 h^2}} + \sum A_{j,n} h^n$$

Here,

X is the distance from an on-the-aspheric-surface point at a height h relative to the optical axis to a tangential plane at the top of the aspheric surface, h is the height relative to the optical axis, $C_j$ is the radius of curvature at the top of an aspheric surface of a lens jth surface ($C_j = 1/R_j$), $K_j$ is the conic constant of the lens jth surface, and $A_{j,n}$ is the nth-order aspheric constant of the lens jth surface.

Further, a phase difference caused by a diffraction structure added to an optical surface is provided by the following formula 2.

$$\phi(h) = \Sigma P_{j,m} h^{2m}$$

The meaning of each character in the formula 2 is as follows:

$\Phi(h)$ is a phase function, h is the height relative to the optical axis, and $P_{j,m}$ is the 2mth-order phase function coefficient of the lens jth surface.

Numerical Example 1

Numerical Example 1 corresponds to Embodiment 1 shown in FIG. 2. Tables 1 to 4 show construction data of an objective lens element according to Numerical Example 1.

TABLE 1

|  | BD | DVD |
| --- | --- | --- |
| Wavelength | 0.408 | 0.658 |
| Effective diameter | 2.24 | 1.74 |
| NA | 0.86 | 0.6 |
| Working distance (WD) | 0.4 | 0.3 |
| Disc thickness (DT) | 0.1 | 0.6 |
| Focal length | 1.3 | 1.4 |
| Diffraction order of first region on first surface | 2 | −2 |
| Diffraction order of second region on first surface | 1 | — |
| Object point (OP) | ∞ | 100 |

TABLE 2

| Surface No. | Radius of curvature at the top of lens surface | Thickness | Material | Remarks |
| --- | --- | --- | --- | --- |
| 0 |  | OP |  |  |
| 1 | 0.8623596 | 1.53761 | n1 | First region (diffractive surface), second region (diffractive surface) |
| 2 | −1.412713 | WD |  | First region (aspherical surface), second region (aspherical surface) |
| 3 | ∞ | DT | Disc | Planar |
| 4 | ∞ |  |  | Planar |

TABLE 3

| Wavelength | 0.408 | 0.658 |
| --- | --- | --- |
| n1 | 1.52183 | 1.50399 |
| Disc | 1.61642 | 1.57829 |

TABLE 4

| First surface | First region, diffractive surface |
| --- | --- |
|  | Diffractive surface |
| Region | 0 mm to 0.875 mm |
|  | Aspherical constants |
| RD | 0.8623596 |
| k | −0.60941585 |
| A0 | 0 |
| A2 | 0 |
| A4 | 0.030312057 |
| A6 | 0.007903167 |
| A8 | 0.033434594 |
| A10 | −0.040242123 |
| A12 | 0.03565307 |

TABLE 4-continued

| First surface | First region, phase function |
|---|---|
| | Diffractive surface |
| P2 | −126.34959 |
| P4 | 9.7443596 |
| P6 | −3.0387489 |

| First surface | Second region, diffractive surface |
|---|---|
| | Diffractive surface |
| Region | 0.875 mm to 1.135 mm Aspherical constants |
| RD | 0.88351059 |
| k | −0.55670259 |
| A0 | 6.19E−05 |
| A2 | 0 |
| A4 | 0.031839006 |
| A6 | 0.026003687 |
| A8 | 0.014891698 |
| A10 | 0.005484338 |
| A12 | −0.000871703 |
| A14 | −0.004931886 |
| A16 | −0.00766895 |

| First surface | Second region, phase function |
|---|---|
| | Diffractive surface |
| P2 | −130.16042 |
| P4 | 8.8588727 |
| P6 | 3.7653304 |

| Second surface | First region, diffractive surface |
|---|---|
| | Diffractive surface |
| Region | 0 mm to 0.53 mm Aspherical constants |
| RD | −1.4180252 |
| k | −23.75474 |
| A0 | 0 |
| A2 | 0 |
| A4 | 0.35949876 |
| A6 | −0.28463298 |
| A8 | −3.2713988 |
| A10 | 19.065115 |
| A12 | −33.47043 |

| Second surface | Second region, diffractive surface |
|---|---|
| | Diffractive surface |
| Region | 0.53 mm to 0.88 mm Aspherical constants |
| RD | −2.6229919 |
| k | −99.799757 |
| A0 | −0.014713257 |
| A2 | 0 |
| A4 | 0.026112683 |
| A6 | −0.019911979 |
| A8 | −0.059772709 |
| A10 | −0.018229013 |
| A12 | 0.084205932 |
| A14 | 0.1033072 |
| A16 | −0.13955802 |

A first surface of the objective lens element according to Numerical Example 1 is divided into an inner region (first region) and an outer region (second region). A binary diffractive surface is provided on the inner region including the optical axis, and a sawtooth-like diffractive surface is provided on the outer region. A second surface is divided into an inner region (first region) and an outer region (second region), and the inner region and the outer region are formed by different aspheric surfaces, respectively. A peripheral wall portion having a rotary symmetry axis which coincides with the optical axis is formed at the outer periphery of the objective lens element. The objective lens element according to Numerical Example 1 is compatible with BD and DVD. For BD, the designed wavelength is 408 nm, the focal length is 1.3 mm, the numerical aperture (NA) is 0.86, and the protective layer thickness of an information storage medium is 0.1 mm. For DVD, the designed wavelength is 658 nm, the focal length is 1.4 mm, the NA is 0.6, and the protective layer thickness of an information storage medium is 0.6 mm.

Figure 7:
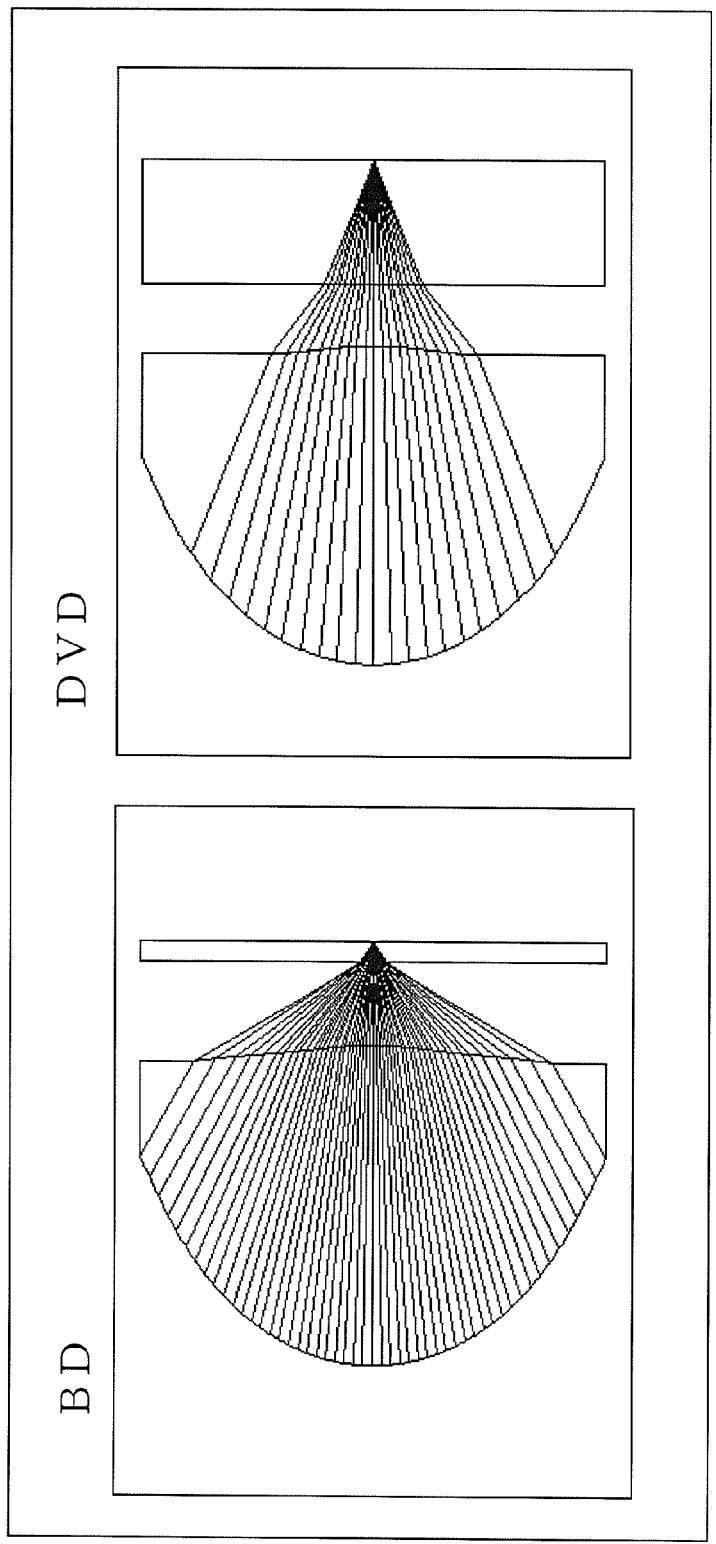
FIG. 7 is optical path diagrams of an objective lens element according to Numerical Example 1.
Figure 8:
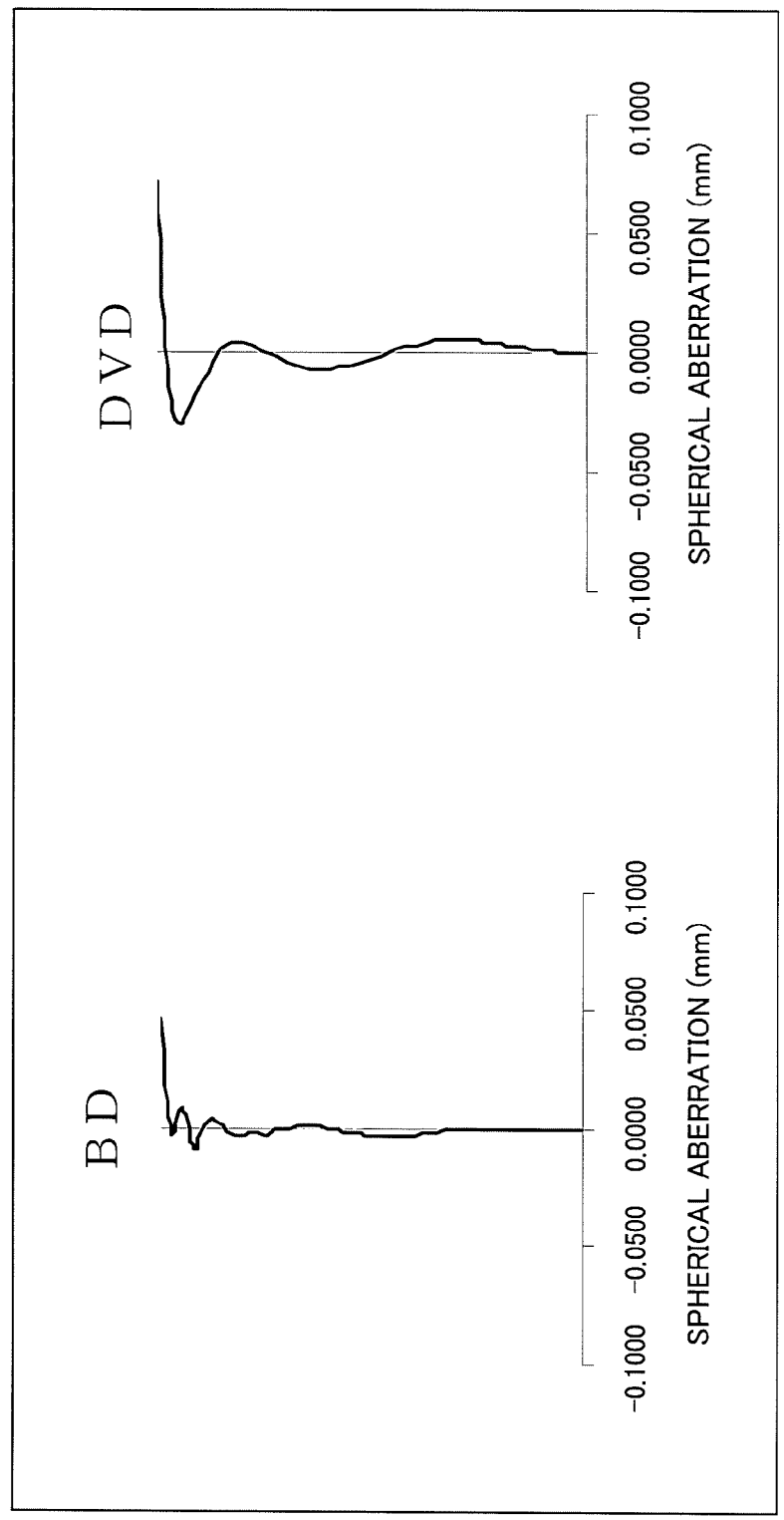
FIG. 8 is graphs showing spherical aberrations of the objective lens element according to Numerical Example 1.
Figure 9:
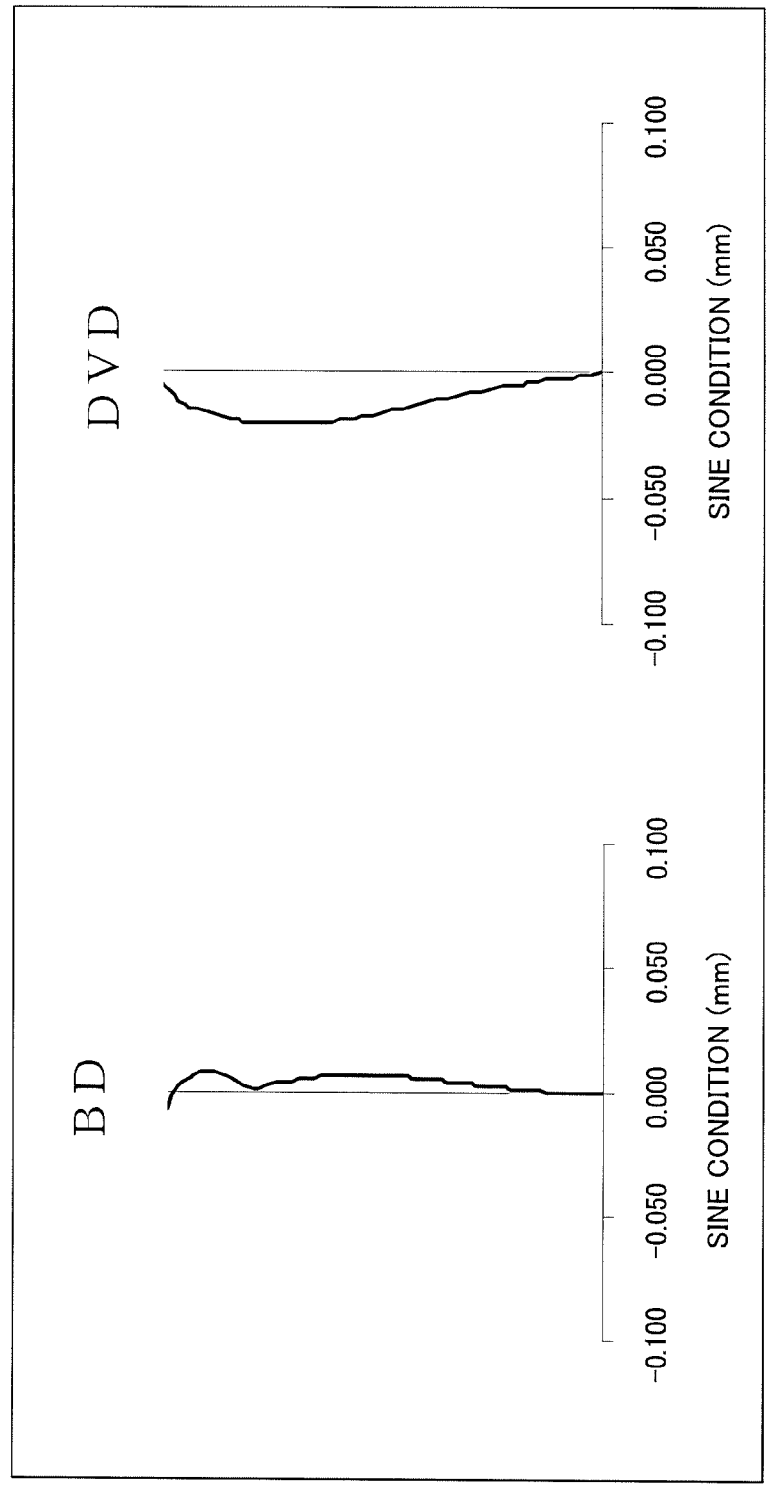
FIG. 9 is graphs showing sine conditions of the objective lens element according to Numerical Example 1.

FIG. 7 is optical path diagrams of the objective lens element according to Numerical Example 1. FIG. 8 is graphs showing spherical aberrations of the objective lens element according to Numerical Example 1. FIG. 9 is graphs showing sine conditions of the objective lens element according to Numerical Example 1. In FIGS. 8 and 9, the graphs for BD show data obtained when parallel light is incident on the objective lens element and a spot is formed through a protective layer having a thickness of 0.1 mm. Meanwhile, the graphs for DVD show data obtained when diverging light (a virtual object point distance of 100 mm) is incident on the objective lens element and a spot is formed through a protective layer having a thickness of 0.6 mm. During recording or reproducing on DVD, the position of the collimating lens is moved along the optical axis direction to cause diverging light to be incident on the objective lens element. The virtual object point distance refers to an object point distance which is determined when it is assumed that the diverging light is emitted from a light source, not from a collimating lens. As seen from FIGS. 8 and 9, aberrations are favorably compensated.

Table 5 shows values obtained from the optical specifications according to Numerical Example 1.

TABLE 5

| | | 408 nm | 658 nm |
|---|---|---|---|
| Diffraction angle | deg | 0.66 | −1.09 |
| Refraction angle | deg | 23.05 | 23.06 |
| Power of diffractive surface | 1/mm | 0.64 | 0.53 |
| Power of refractive surface | 1/mm | 0.605 | 0.584 |
| Focal length of lens | mm | 1.30 | 1.44 |
| Focal length of lens (excluding diffraction) | mm | 1.34 | 1.37 |

The diffraction angle and the refraction angle in Table 5 are values obtained for a light beam incident on the position of a radius of 0.872 mm in the inner region of the first surface of the objective lens element. At a wavelength of 408 nm, 2nd diffraction order light is light having the maximum diffraction efficiency, and at a wavelength of 658 nm, −2nd diffraction order light is light having the maximum diffraction efficiency.

Here, the positive sign of a diffraction order is defined to represent a direction of diffraction toward the lens inner side. The "diffraction angle" does not include an angle of refraction of a base aspheric surface and indicates an angle of bending only by diffraction. The "base aspheric surface" refers to an aspheric shape defined by an aspheric coefficient in the construction data shown in Tables 1 to 4.

The "refraction angle" refers to an angle change caused by the refraction effect of a base aspheric surface shape. The "power of a diffractive surface" refers to the power of a surface on which a diffraction structure is provided, and is indicated by the sum of power by diffraction and power by refraction. Where the focal length of the surface is f, the "power" is indicated by 1/f. The "power of a refractive surface" refers to the power obtained by removing power by diffraction from the power of the diffractive surface. In other words, the "power of a refractive surface" refers to power by refraction by a base aspheric surface, and is the same as the power of the surface when the diffraction order is zero order. The "lens focal length" refers to the focal length determined by the effects of both diffraction and refraction. The "lens focal length (excluding diffraction)" refers to the lens focal length determined only by the refraction effect by the base aspheric surface, and is the same as the lens focal length when the diffraction order is zero order.

Further, in the objective lens element according to Numerical Example 1, a step structure is provided in accordance with the range of phase $\Phi(r)$ obtained from the phase function. The relationship between the range of phase $\Phi(r)$ and the height of each step provided on the inner region is as follows.

In regions satisfying $2n\pi \leq \Phi(r) \leq (2n\pi+\pi/2)$: $-1.875$ wavelengths In regions satisfying $2n\pi+\pi/2 \leq \Phi(r) \leq (2n\pi+\pi)$: $-0.625$ wavelength In regions satisfying $2n\pi+\pi \leq \Phi(r) \leq (2n\pi+3\pi/2)$: $+0.625$ wavelength In regions satisfying $2n\pi+3\pi/2 \leq \Phi(r) \leq (2n\pi+2\pi)$: $+1.875$ wavelengths In reality, the step height corresponding to 1 wavelength is represented by $\lambda/(nd-1)$ [$\lambda$: designed wavelength, nd: the material refractive index with respect to the wavelength]. Steps obtained by multiplying the step height by each coefficient are formed on the base aspheric surface shape.

Further, a sawtooth-like diffraction shape is provided on the outer region (region dedicated for BD). The outer region is used only for BD, the blaze depth is set so as to be three times of the wavelength for BD such that the outer region exerts an aperture limiting function when DVD is used, and the diffraction order of the light of the wavelength for BD is +3rd order. However, the diffraction order of the light of the wavelength for BD may be an order other than +3rd order.

Numerical Example 2

Numerical Example 2 corresponds to Embodiment 2 shown in FIG. 6. Tables 6 to 10 show construction data of the objective lens element according to Numerical Example 2.

TABLE 6

|  | BD | DVD | CD |
|---|---|---|---|
| Wavelength | 0.408 | 0.658 | 0.785 |
| Effective diameter | 2.24 | 1.75 | 1.49 |
| NA | 0.86 | 0.6 | 0.47 |
| Working distance (WD) | 0.4 | 0.3 | 0.035 |
| Disc thickness (DT) | 0.0875 | 0.6 | 1.2 |
| Focal length | 1.3 | 1.4 | 1.5 |
| Diffraction order of first region on first surface | 2 | −2 | −3 |
| Diffraction order of second region on first surface | 1 | −1 | — |

TABLE 6-continued

|  | BD | DVD | CD |
|---|---|---|---|
| Diffraction order of third region on first surface | 3 | — | — |
| Object point (OP) | ∞ | 100 | 31 |

TABLE 7

| Surface No. | Radius of curvature at the top of lens surface | Thickness | Material | Remarks |
|---|---|---|---|---|
| 0 |  | OP |  |  |
| 1 | 0.85748234 | 1.537237 | n1 | First region (diffractive surface), second region (diffractive surface), third region (diffractive surface) |
| 2 | −1.412713 | WD |  | First region (aspherical surface), second region (aspherical surface) |
| 3 | ∞ | DT | Disc | Planar |
| 4 | ∞ |  |  | Planar |

TABLE 8

| Wavelength | 0.408 | 0.658 | 0.785 |
|---|---|---|---|
| n1 | 1.52183 | 1.50399 | 1.50082 |
| Disc | 1.61642 | 1.57829 | 1.57203 |

TABLE 9

| First surface | First region, diffractive surface |
|---|---|
|  | Diffractive surface |
| Region | 0 mm to 0.744 mm Aspherical constants |
| RD | 0.85748234 |
| k | −0.60256163 |
| A0 | 0 |
| A2 | 0 |
| A4 | 0.033107557 |
| A6 | 0.011631507 |
| A8 | 0.013025021 |
| A10 | 0.001288994 |
| A12 | 0.005707887 |

| First surface | First region, phase function |
|---|---|
|  | Diffractive surface |
| P2 | −133.21672 |
| P4 | 15.209362 |
| P6 | −12.5098225 |

| First surface | Second region, diffractive surface |
|---|---|
|  | Diffractive surface |
| Region | 0.744 mm to 0.874 mm Aspherical constants |
| RD | 0.85748234 |
| k | −0.60256163 |
| A0 | 0 |
| A2 | 0 |

TABLE 9-continued

| | |
|---|---|
| A4 | 0.033107557 |
| A6 | 0.011631507 |
| A8 | 0.013025021 |
| A10 | 0.001288994 |
| A12 | 0.005707887 |
| First surface | Second region, phase function |
| | Diffractive surface |
| P2 | −133.21672 |
| P4 | 15.209362 |
| P6 | −12.5098225 |
| First surface | Third region, diffractive surface |
| | Diffractive surface |
| Region | 0.874 mm to 1.118 mm Aspherical constants |
| RD | 0.88680595 |
| k | −0.57080287 |
| A0 | 0.016720806 |
| A2 | 0.00E+00 |
| A4 | 0.022217526 |
| A6 | 0.020728562 |
| A8 | 0.015644616 |
| A10 | 0.01020251 |
| A12 | 0.004883069 |
| A14 | −0.001592452 |
| A16 | −0.008783607 |
| A18 | −0.006987794 |
| First surface | Third region, phase function |
| | Diffractive surface |
| P2 | −180.40761 |
| P4 | −15.453924 |
| P6 | −117.34886 |

TABLE 10

| | |
|---|---|
| Second surface | First region, diffractive surface |
| | Diffractive surface |
| Region | 0 mm to 0.5 mm Aspherical constants |
| RD | −1.4289724 |
| k | −28.21094 |
| A0 | 0 |
| A2 | 0 |
| A4 | 0.35962053 |
| A6 | −0.21076197 |
| A8 | −3.4636071 |
| A10 | 14.626518 |
| A12 | −20.43886 |
| Second surface | Second region, diffractive surface |
| | Diffractive surface |
| Region | 0.5 mm to 0.86 mm Aspherical constants |
| RD | −2.262808 |
| k | −133.47989 |
| A0 | −0.013717523 |
| A2 | 0 |

TABLE 10-continued

| | |
|---|---|
| A4 | 0.035889372 |
| A6 | −0.03478197 |
| A8 | −0.084319926 |
| A10 | −0.016143085 |
| A12 | 0.10646318 |
| A14 | 0.087266298 |
| A16 | −0.20318975 |
| A18 | 0.074148738 |

A first surface of the objective lens element according to Numerical Example 2 is divided into an inner region (first region), an intermediate region (second region), and an outer region (third region). Different binary diffraction structures are provided on the inner region and the intermediate region, respectively, of the first surface, and a sawtooth-like diffraction structure is provided on the outer region. A second surface is divided into an inner region (first region) and an outer region (second region). The inner region and the outer region of the second surface are formed by different aspheric surfaces, respectively. A peripheral wall portion having a rotary symmetry axis which coincides with the optical axis is formed at the outer periphery of the objective lens element.

The objective lens element according to Numerical Example 2 is compatible with BD, DVD, and CD. For BD, the designed wavelength is 408 nm, the focal length is 1.3 mm, the numerical aperture (NA) is 0.86, and the protective layer thickness of an information storage medium is 0.0875 mm. Here, the reason why the designed protective layer thickness is set to 0.0875 mm is to be compatible with a multilayer BD and is that the designed protective layer thickness is set as a thickness between the thickest protective layer and the thinnest protective layer. For DVD, the designed wavelength is 658 nm, the focal length is 1.4 mm, the NA is 0.6, and the protective layer thickness of an information storage medium is 0.6 mm. For CD, the designed wavelength is 785 nm, the focal length is 1.5 mm, the NA is 0.47, and the protective layer thickness of an information storage medium is 1.2 mm.

Figure 10:
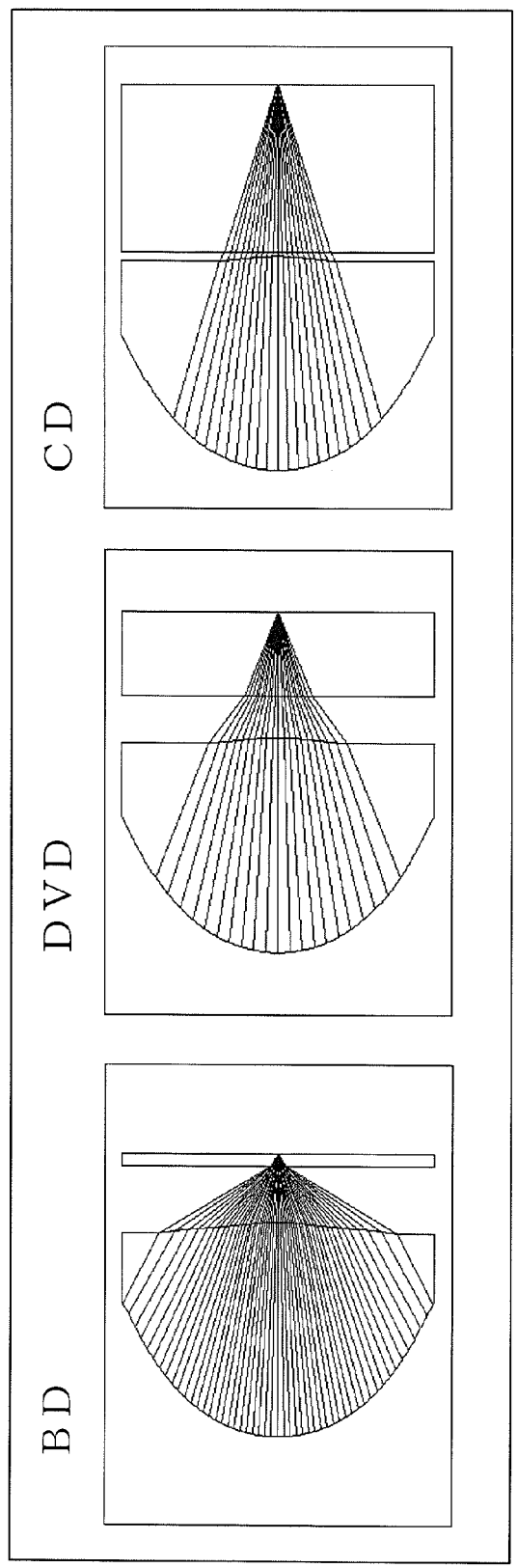
FIG. 10 is optical path diagrams of an objective lens element according to Numerical Example 2.
Figure 11:
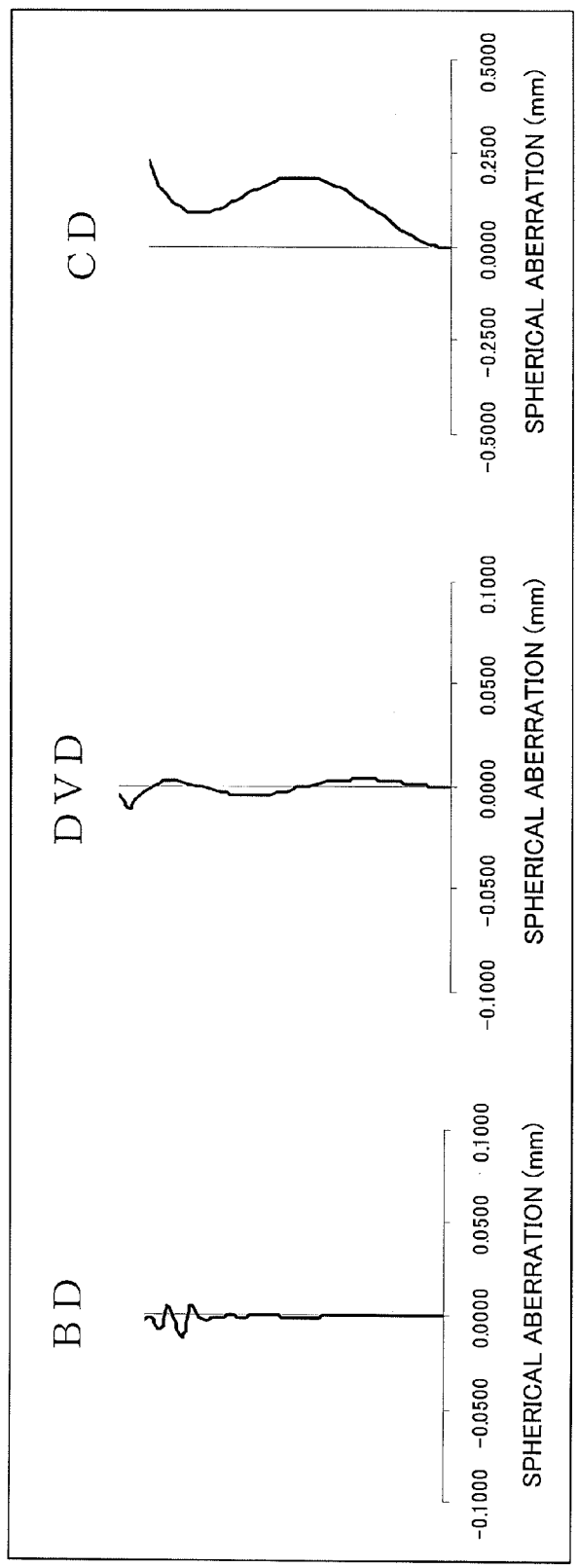
FIG. 11 is graphs showing spherical aberrations of the objective lens element according to Numerical Example 2.
Figure 12:
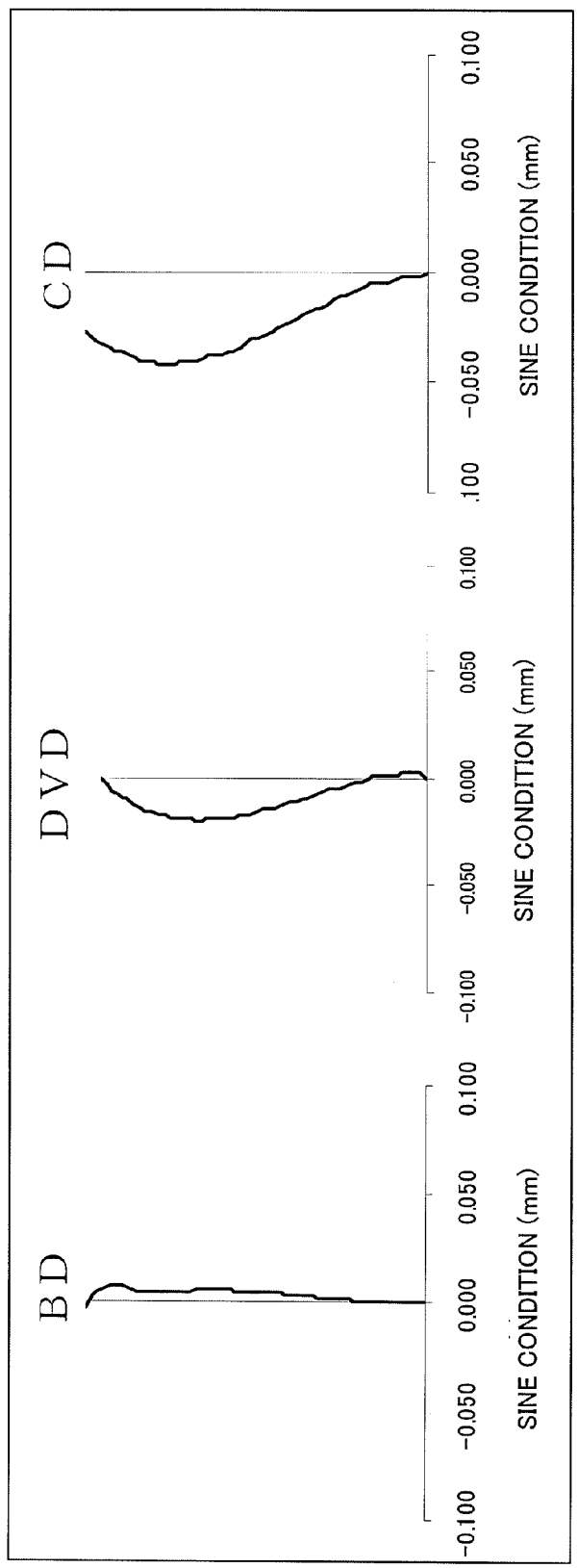
FIG. 12 is graphs showing sine conditions of the objective lens element according to Numerical Example 2.

FIG. 10 is optical path diagrams of the objective lens element according to Numerical Example 2. FIG. 11 is graphs showing spherical aberrations of the objective lens element according to Numerical Example 2. FIG. 12 is graphs showing sine conditions of the objective lens element according to Numerical Example 2. In FIGS. 11 and 12, the graphs for BD show data obtained when parallel light is incident on the objective lens element and a spot is formed through a protective layer having a thickness of 0.0875 mm. The graphs for DVD show data obtained when diverging light (a virtual object point distance of 100 mm) is incident on the objective lens element and a spot is formed through a protective layer having a thickness of 0.6 mm. The graphs for CD show data obtained when diverging light (a virtual object point distance of 31 mm) is incident on the objective lens element and a spot is formed through a protective layer having a thickness of 1.2 mm. The virtual object point distance refers to an object point distance which is determined when it is assumed that the diverging light is emitted from a light source, not from a collimating lens. As seen from FIGS. 11 and 12, aberrations are favorably compensated.

Table 11 shows values obtained from the optical specifications according to Numerical Example 2.

TABLE 11

| | | 408 nm | 658 nm | 785 nm |
|---|---|---|---|---|
| Diffraction angle | deg | 0.7 | −1.2 | −2.1 |
| Refraction angle | deg | 19.3 | 18.8 | 18.4 |
| Power of diffractive surface | 1/mm | 0.03 | −0.06 | −0.10 |
| Power of refractive surface | 1/mm | 0.61 | 0.59 | 0.58 |

TABLE 11-continued

|  |  | 408 nm | 658 nm | 785 nm |
|---|---|---|---|---|
| Focal length of lens | mm | 1.300 | 1.448 | 1.519 |
| Focal length of lens (excluding diffraction) | mm | 1.338 | 1.376 | 1.383 |

The diffraction angle and the refraction angle in Table 11 are values obtained for a light beam which is incident on the position of a radius of 0.764 mm in the inner region of the first surface of the objective lens element according to Numerical Example 2 and has a diffraction order providing the highest diffraction efficiency by the binary diffraction structure. At a wavelength of 408 nm, 2nd diffraction order light is light having the maximum diffraction efficiency; at a wavelength of 658 nm, −2nd diffraction order light is light having the maximum diffraction efficiency; and at a wavelength of 785 nm, −3rd diffraction order light is light having the maximum diffraction efficiency.

Here, the positive sign of a diffraction order is defined to represent a direction of diffraction toward the lens inner side. The "diffraction angle" does not include an angle of refraction of a base aspheric surface and indicates an angle of bending only by diffraction. The "refraction angle" refers to an angle change caused by the refraction effect of a base aspheric surface shape. A stair-like binary structure consisting of eight steps is provided on the inner region (region shared by three wavelengths) of the first surface.

In the objective lens element according to Numerical Example 2, the relationship between the height of each step provided on the inner region of the first surface and the range of phase $\Phi(r)$ is as follows.

In regions satisfying $4n\pi \leq \Phi(r) \leq (4n\pi+\pi/2)$: −4.375 wavelengths In regions satisfying $4n\pi+\pi/2 \leq \Phi(r) \leq (4n\pi+\pi)$: −3.125 wavelengths In regions satisfying $4n\pi+\pi \leq \Phi(r) \leq (4n\pi+3\pi/2)$: −1.875 wavelengths In regions satisfying $4n\pi+3\pi/2 \leq \Phi(r) \leq (4n\pi+2\pi)$: −0.625 wavelength In regions satisfying $4n\pi+2\pi \leq \Phi(r) \leq (4n\pi+5\pi/2)$: +0.625 wavelength In regions satisfying $4n\pi+5\pi/2 \leq \Phi(r) \leq (4n\pi+3\pi)$: +1.875 wavelengths In regions satisfying $4n\pi+3\pi \leq \Phi(r) \leq (4n\pi+7\pi/2)$: +3.125 wavelengths In regions satisfying $4n\pi+7\pi/2 \leq \Phi(r) \leq (4n\pi+4\pi)$: +4.375 wavelengths In reality, the step height corresponding to 1 wavelength is represented by $\lambda/(nd-1)$ [$\lambda$: designed wavelength, nd: the material refractive index with respect to the wavelength]. Steps obtained by multiplying the step height by each coefficient are formed on the base aspheric surface shape.

Further, a stair-like binary diffraction structure consisting of four steps is provided on the intermediate region (region shared by two wavelengths) of the first surface. The relationship between the height of each step provided on the intermediate region in Numerical Example 2 and the range of phase $\Phi(r)$ is the same as that for the inner region in Numerical Example 1, and thus the description thereof is omitted.

Further, a sawtooth-like diffraction shape is provided on the outer region (region dedicated for BD) of the first surface. Here, +1st order is used as the diffraction order for BD, and thus the blaze depth is set to 1 wavelength of the wavelength for BD.

The present invention can be used for an optical pickup device having compatibility with a plurality of types of optical discs having different base material thicknesses, different compatible wavelengths, and different recoding densities, and a system (e.g., a computer, an optical disc player, an optical disc recorder, a car navigation system, an editing system, a data server, an AV component, a vehicle, etc.) employing this optical pickup device.

While the invention has been described in detail, the foregoing description is in all aspects illustrative and not restrictive. It will be understood that numerous other modifications and variations can be devised without departing from the scope of the invention.

What is claimed is:

1. An objective lens element which has optically functional surfaces on an incident side and an exit side, which converges a first incident light beam of a wavelength $\lambda_1$ through a base plate having a thickness $t_1$ to form a spot, and which converges a second incident light beam of a wavelength $\lambda_2$ longer than the wavelength $\lambda_1$ through a base plate having a thickness $t_2$ larger than the thickness $t_1$ to form a spot, wherein at least either one of the optically functional surfaces on the incident side and the exit side includes a diffraction portion which satisfies at least either one of the following formulas (1) and (2):

$$\theta_1 \times \theta_2 < 0 \text{("×" represents multiplication)} \quad (1), \text{ and}$$

$$(\sin \theta_2)/\lambda_2 = -(\sin \theta_1)/\lambda_1 \quad (2),$$

where $\theta_1$ is the diffraction angle of a light beam having a diffraction order providing the maximum diffraction efficiency at the wavelength $\lambda_1$ ($\theta_1 \neq 0$), and $\theta_2$ is the diffraction angle of a light beam having a diffraction order providing the maximum diffraction efficiency at the wavelength $\lambda_2$ ($\theta_2 \neq 0$).

* * * * *